US012482627B2

(12) United States Patent
Canazon

(10) Patent No.: US 12,482,627 B2
(45) Date of Patent: Nov. 25, 2025

(54) X-RAY TUBE WITH REDUCED ATTENUATION

(71) Applicant: John Canazon, Lawrenceville, GA (US)

(72) Inventor: John Canazon, Lawrenceville, GA (US)

( * ) Notice: Subject to any disclaimer, the term of this patent is extended or adjusted under 35 U.S.C. 154(b) by 0 days.

(21) Appl. No.: 18/268,848

(22) PCT Filed: Dec. 7, 2022

(86) PCT No.: PCT/US2022/052146

§ 371 (c)(1),
(2) Date: Jun. 21, 2023

(87) PCT Pub. No.: WO2023/107565

PCT Pub. Date: Jun. 15, 2023

(65) Prior Publication Data

US 2024/0312755 A1 Sep. 19, 2024

Related U.S. Application Data

(60) Provisional application No. 63/287,738, filed on Dec. 9, 2021.

(51) Int. Cl.
*H01J 35/18* (2006.01)
*H01J 35/08* (2006.01)

(52) U.S. Cl.
CPC ............ *H01J 35/18* (2013.01); *H01J 35/116* (2019.05); *H01J 2235/163* (2013.01)

(58) Field of Classification Search
CPC ..... H01J 35/18; H01J 35/116; H01J 2235/163
See application file for complete search history.

(56) References Cited

U.S. PATENT DOCUMENTS 7,706,506 B1 * 4/2010 Woodruff ................ H01J 35/13 378/66
2006/0280290 A1 * 12/2006 Matsumura ............. H01J 35/18 378/140
2017/0278588 A1 * 9/2017 Miller ...................... G21K 5/10
2021/0084739 A1 * 3/2021 Tan ...................... G01N 23/083

* cited by examiner

*Primary Examiner* — Chih-Cheng Kao
(74) *Attorney, Agent, or Firm* — Bryan W. Bockhop; Bockhop Intellectual Property Law, LLC

(57) ABSTRACT

An x-ray tube (100) includes a support structure (114) defining an opening therethrough. A concave x-ray transmission window (116) is sealed to the support structure (114) and covers the opening. The support structure (114) and the x-ray transmission window (116) contain a vacuum. A filament (124) emits electrons (126) upon application of a sufficient potential difference between the filament (124) and the x-ray transmission window (116). A target (118) is disposed the x-ray transmission window (116). The target (118) generates x-rays (128) as when impacted by electrons (126). The x-rays (128) are transmitted through the x-ray transmission window (116).

13 Claims, 5 Drawing Sheets

X-RAY TUBE WITH REDUCED ATTENUATION

BACKGROUND OF THE INVENTION

1. Field of the Invention

The present invention relates to x-ray generating tubes and, more specifically, to x-ray tubes with reduced attenuation.

2. Description of the Related Art

X-rays are used in a variety of applications such as imaging and product irradiation. Imaging applications include producing x-rays for computer aided tomography (CAT) scans. Irradiation applications include producing x-rays used to sterilize packaged food and other products. Imaging applications tend to require relatively less x-ray power than do high throughput irradiation applications.

Existing x-ray tubes include a hot or cold cathode, a filament (such as a tungsten filament in hot cathode embodiments) that is electrically coupled to the cathode, an anode that is spaced away from the filament and a target (such as a gold or tungsten target). In some embodiments, the anode also acts as the target. Certain x-ray tubes employ a pointy cathode, without a separate filament, to generate electrons. Such cathodes are referred to as "cold cathodes." The space between the cathode and the anode is substantially a vacuum. With sufficient voltage applied between the cathode and the anode, then the cathode (either cold or hot) will emit electrons which are accelerated toward the anode and strike the target, thereby generating x-rays.

Many x-ray tubes include a tube of aluminum with a hemispherical end in which a vacuum is maintained. The arrangement of the cathode and the anode is configured so that x-rays generated from the target tend to exit from a specific portion of the tube. Because the tube is maintained under vacuum and generally has a convex shape, the walls of the tube have to be relatively thick to prevent deformation of the tube. However, attenuation of x-rays exiting the tube increases as a function of the thickness of the tube where the x-rays exit. High attenuation results in increased cost of the tube.

Therefore, there is a need for an x-ray tube with reduced attenuation of x-rays.

SUMMARY OF THE INVENTION

The disadvantages of the prior art are overcome by the present invention which, in one aspect, is an x-ray tube that includes a support structure defining an opening therethrough. A concave x-ray transmission window is sealed to the support structure and covers the opening. The support structure and the x-ray transmission window define a void therein that contains at least a partial vacuum. A filament is configured to emit electrons upon application of a sufficient potential difference between the filament and the x-ray transmission window. A target is spaced away from the filament and is disposed on an interior side of the x-ray transmission window. The target generates x-rays as a result of being impacted by electrons from the filament. At least a portion of the x-rays are transmitted through the x-ray transmission window.

In another aspect, the invention is a method of making an x-ray tube, in which a three dimensional support structure that defines a void therein and that defines at least one opening therethrough is generated. A selected one of a metal thin film or a metal foil is affixed to the support structure so as to cover the opening, thereby forming an x-ray transmission window. A target is disposed on an interior side of the x-ray transmission window. The target includes a material that generates x-rays as a result of electrons striking the target. A filament is placed inside of the support structure. The filament emits electrons, a portion of which will impact the target, as a result of application of a sufficient potential difference between the filament and the x-ray transmission window. The filament and the x-ray transmission window are electrically coupled to a voltage source. The support structure is sealed and substantially all of the air in the void is evacuated to form at least a partial vacuum therein, which causes the x-ray transmission window to be concave relative to outside of the x-ray tube.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1A:
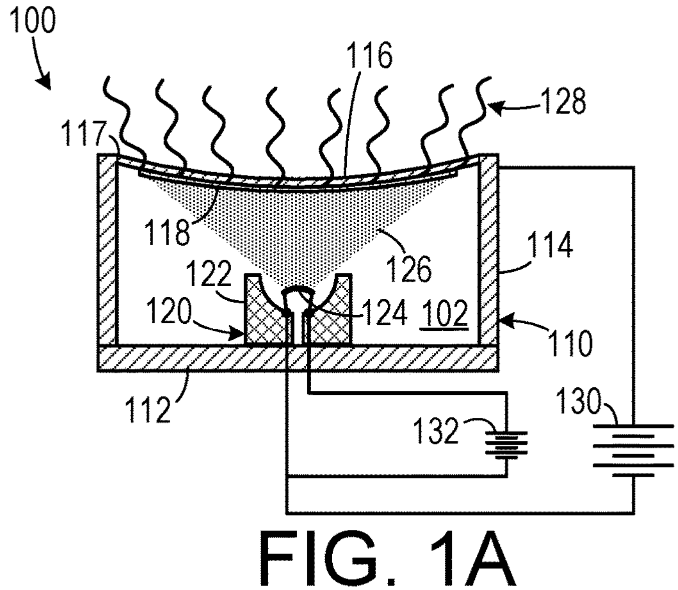
FIG. 1A is a schematic diagram of one embodiment of an x-ray tube with a thin x-ray transmission window.
Figure 1B:
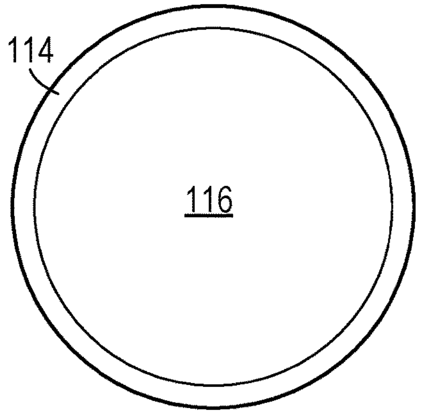
FIG. 1B is a top plan view of the x-ray tube shown in FIG. 1A.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIGS. 1A-1*i*, one embodiment of an x-ray tube with reduced attenuation 100 includes a support structure 110 having a base 112, a wall 114 (or plurality of walls) that define an opening 117 and a metal thin film or metal foil transmission window 116 that is sealed thereto. Together, they define a void 102 in which a vacuum is maintained. The base 112 and the wall 114 are thick enough to maintain structural integrity when subjected to the vacuum. The transmission window 116 is thinner than base 112 and the wall 114 because it is concave and, therefore, the vacuum draws it into a parabolic natural shape. In one embodiment, the wall 114 is cylindrical and the wall 114 and the transmission window 116 are all contiguously made from the same material (e.g., aluminum).

A target 118 is disposed adjacent to the transmission window 116, which is configured to act as an anode. Typically, the target is a thin film of a target material, such as gold, tungsten, copper, (or certain combinations of these metals) etc., that has been applied to the transmission window 116 by a process such as sputtering or vapor deposition. A cathode 120 is disposed inside the support structure 110. The cathode 120 includes a dielectric support structure 122 and a filament 124. A first power supply 130 voltage source is configured to apply a potential difference between the filament 124 and the target 118. A second power supply 132 is configured to drive a current through the filament 124 so as to cause it to become heated, thereby facilitating easier emission of electrons.

The cathode 120 can have a shape that is configured so that when the filament 124 is heated sufficiently and when a sufficient potential difference exists between the filament 124 and the transmission window 116, the filament 124 will emit electrons and an electron beam 126 will be directed toward the target 118. Electrons striking the target 118 will cause the target to emit x-rays 128.

The wall 114, because it is convex, must be relatively thick in order to maintain its shape when it is subjected to the vacuum. However, because the transmission window 116 naturally assumes a concave parabolic shape when subjected to the vacuum, its shape will be naturally maintained by the vacuum so long as its tensile strength is sufficient so that the transmission window 116 is disrupted by the vacuum. As a result, the transmission window 116 can be substantially thinner than the wall 114. By using a thinner transmission window 116, the x-rays 128 generated by the target 118 are attenuated less than if they were subjected to a thicker transmission window.

Figure 2A:
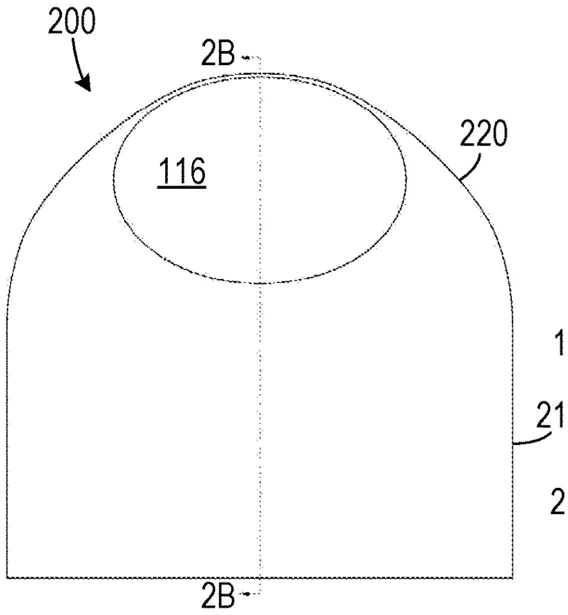
FIGS. 2A-2B are schematic diagrams of a second embodiment of an x-ray tube.
Figure 2B:
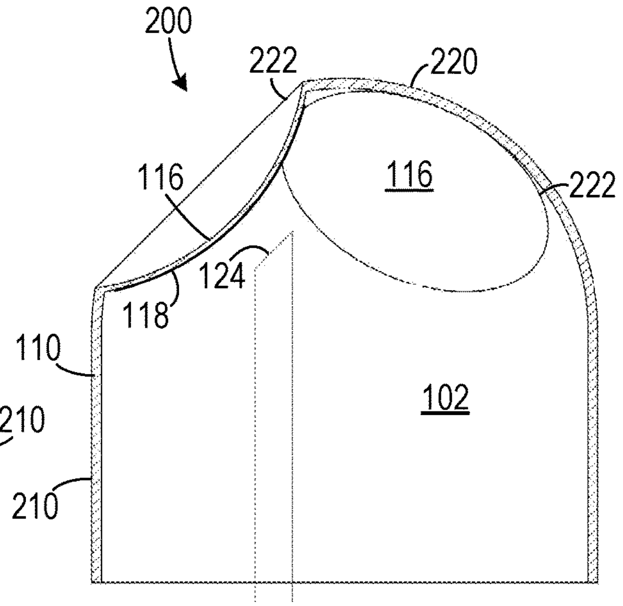

An embodiment of an x-ray tube 200 having a shape resembling a conventional x-ray tube, but with concave transmission windows/anodes 116 is shown in FIGS. 2A-2B. This embodiment has a support structure 110 that includes a relatively thick tube portion 210 and that terminates in a dome 220. The dome 220 defines one or more openings 222 that are covered with a relatively thin transmission window 116, which becomes concave once the void 102 defined by the x-ray tube 200 is evacuated.

Figure 3A:
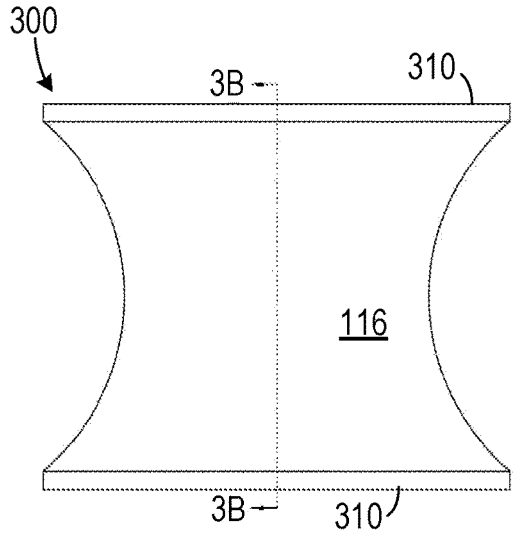
FIGS. 3A-3C are schematic diagrams of a third embodiment of an x-ray tube.
Figure 3B:
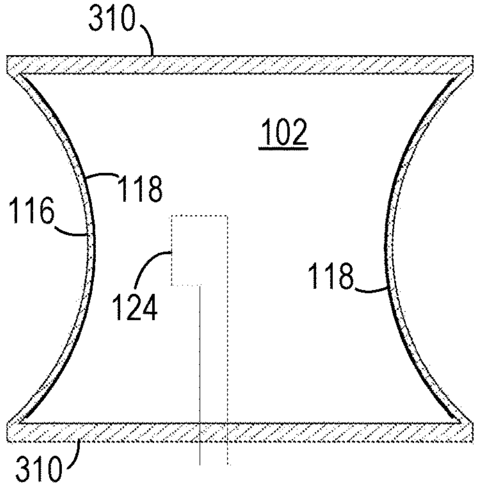
Figure 3C:
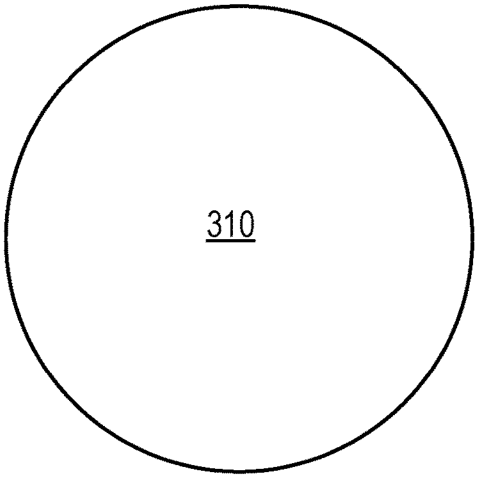
Figure 4A:
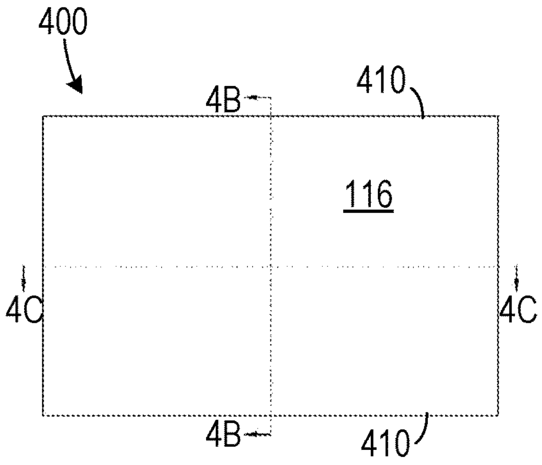
FIGS. 4A-4D are schematic diagrams of a fourth embodiment of an x-ray tube.
Figure 4B:
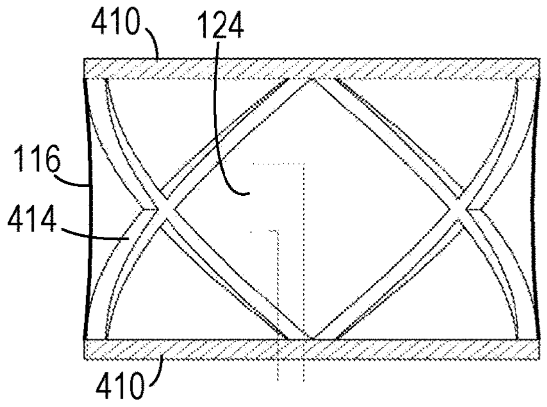
Figure 4C:
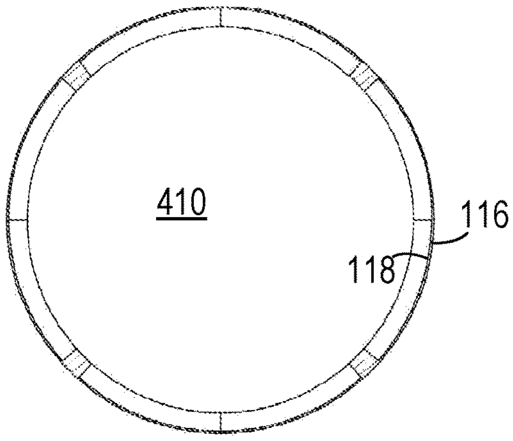
Figure 4D:
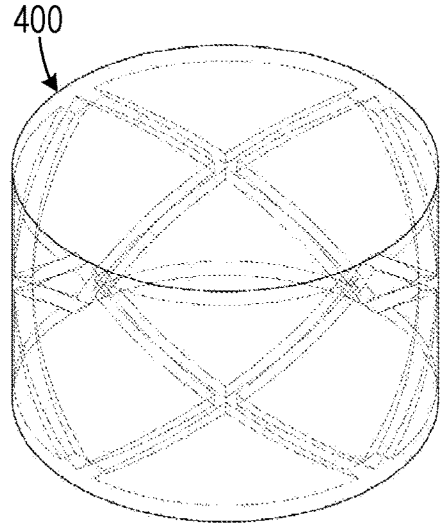
Figure 5A:
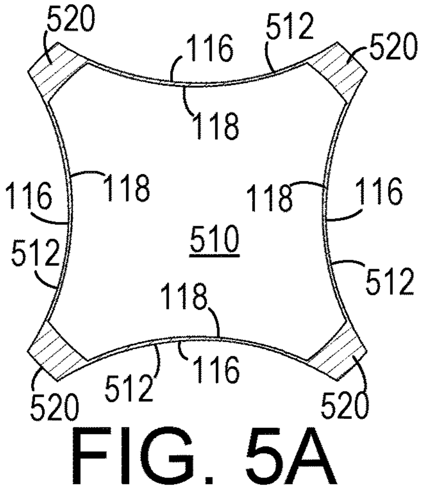
FIGS. 5A-5D are schematic diagrams of a fifth embodiment of an x-ray tube.
Figure 5B:
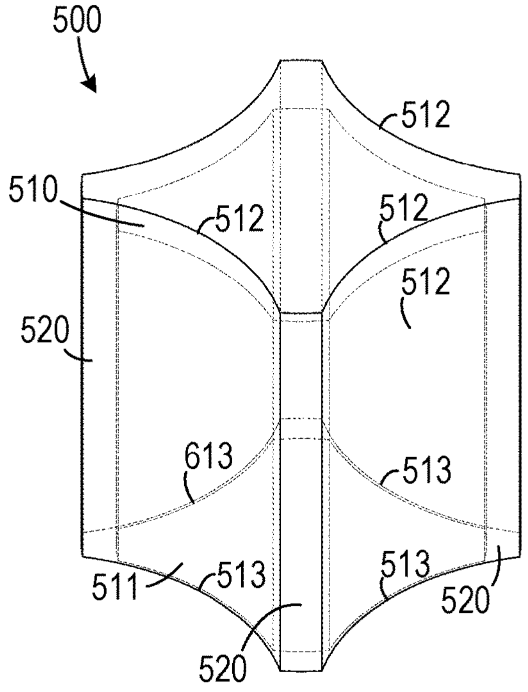
Figure 5C:
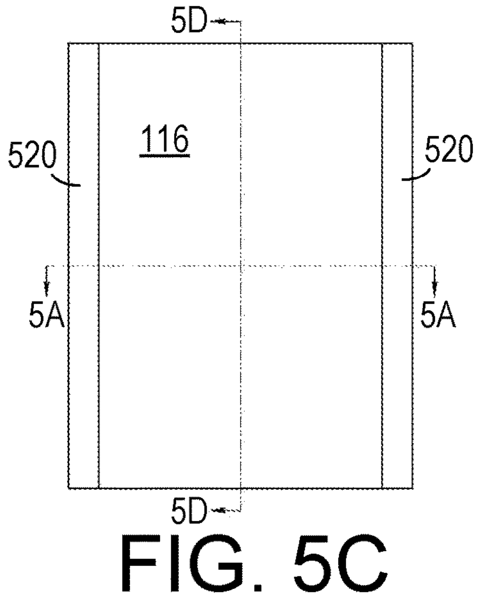
Figure 5D:
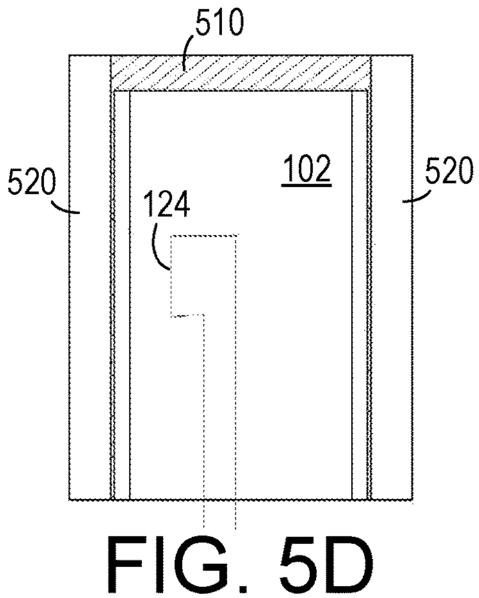

A cylindrical tube embodiment of an x-ray tube 300 with a concave transmission window 116 is shown in FIGS. 3A-3C. In this embodiment, the support structure includes two spaced-apart discs 310. The x-ray transmission window 116 includes a metal thin film or a metal foil wrapped around and sealed to each of the two spaced-apart discs 310.

A tube embodiment of an x-ray tube 400 in which the x-ray transmission window 116 is essentially a cylinder that is supported by a support framework 414 and two spaced-apart discs 410 is shown in FIGS. 4A-4D. In this embodiment, the concave thin film/foil of the x-ray transmission window 116 is wrapped around the circumference of the anode frame. This embodiment can improve both threw transmission of x-rays as well as the x-ray reflection characteristics.

Similarly, a prismatic embodiment of an x-ray tube 500 having a concave thin film/foil transmission window 116 disposed around a prismatic frame 520 is shown in FIGS. 5A-5D. A first plate 510 can define the shape of the prism of the x-ray tube 500 and has at least one inwardly-curved edge 512. A second plate 511 that is spaced apart from and parallel to the first place 510 has at least one second inwardly-curved edge 513 that is aligned with the least one first inwardly-curved edge 512.

Figure 6C:
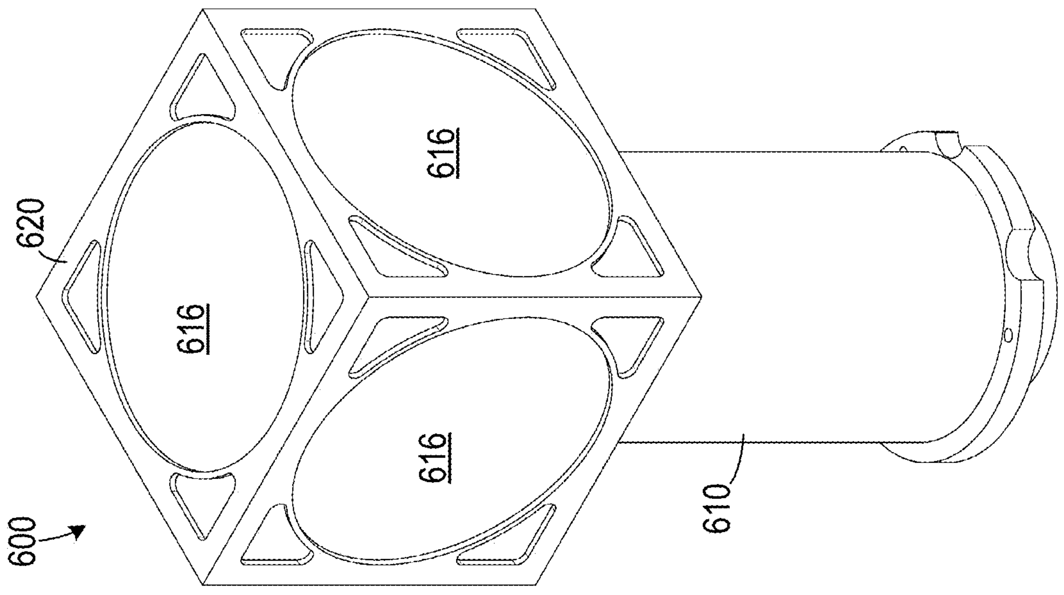
FIGS. 6A-6C are schematic diagrams of a sixth embodiment of an x-ray tube.
Figure 6B:
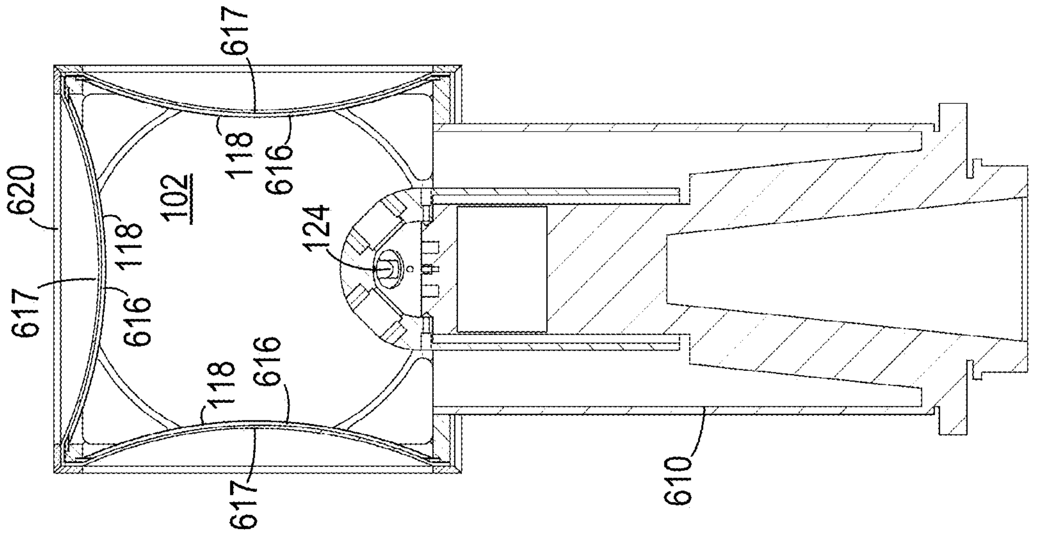
Figure 6A:
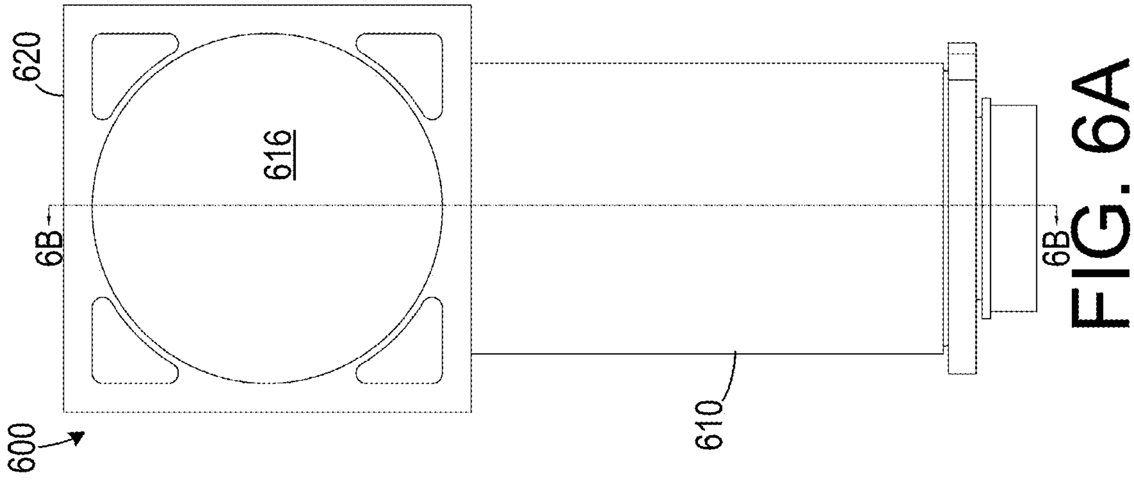

A cube shaped embodiment of an x-ray tube 600 is shown in FIGS. 6A-6C. This embodiment includes a tubular base 610 that terminates in a cube-shaped portion 620. An x-ray transmission window 616 is defined in at least a first side of the cube 620. (In the embodiment shown, each face of the cube 620, except for the bottom side, includes an x-ray transmission window 616.) Also, in certain embodiments, the cube 620 can be coupled to the base 610 at an edge or a vertex so that all six sides include an x-ray transmission window. Also shown is a cooling channel 617 integrated with the x-ray transmission window 616. While not shown in the previously discussed figures, all embodiments would include a cooling system, such as a water jacket system, to remove heat generated by the target from the transmission window as x-rays are being generated. In the embodiment shown, the cooling system could include a water jacket system in which water flows across the x-ray transmission window 616 through the cooling channel 617 and is transported to a heat exchanger.

To make an x-ray tube of the type disclosed above, a three dimensional support structure that defines a void therein and that defines at least one opening therethrough is generated. A metal thin film or a metal foil is affixed to the support structure so as to cover the opening, thereby forming an x-ray transmission window. A thin film of a target material (e.g., gold, copper, tungsten, etc.) is disposed on an interior side of the x-ray transmission window to form an x-ray emitting target. Typically, the target material is applied to the interior side of the x-ray transmission window through sputtering or chemical vapor deposition. A filament and a cathode are placed inside of the support structure. The filament and the x-ray transmission window are electrically coupled to a voltage source. The support structure is sealed and substantially all of the air in the void is evacuated to form at least a partial vacuum therein. This causes the x-ray transmission window to be concave relative to outside of the x-ray tube.

In one embodiment, the target is on the outside of the tube instead of the inside. In one embodiment, the thin film/foil of the target can also include a thin baking material for extra strength if needed. In one embodiment, a wire mesh can be used to support the anode.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above-described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. An x-ray tube, comprising:

(a) a support structure comprising a cube having six faces in which at least two of the faces each define an opening therethrough;

(b) at least two concave x-ray transmission windows sealed to the support structure and each covering a different one of the openings, wherein the support structure and the x-ray transmission windows define a void therein that contains at least a partial vacuum;

(c) a filament configured to emit electrons upon application of a sufficient potential difference between the filament and the x-ray transmission windows; and (d) at least two targets, each spaced away from the filament and disposed on an interior side of a different one of the x-ray transmission windows, wherein the targets generate x-rays as a result of being impacted by electrons from the filament and wherein at least a portion of the x-rays are transmitted through the x-ray transmission windows, wherein substantially all of the x-rays generated by the target and exiting the x-ray tube pass through the concave x-ray transmission windows.

2. The x-ray tube of claim 1, wherein the support structure has a first thickness and wherein the x-ray transmission window has a second thickness that is thinner than the first thickness.

3. The x-ray tube of claim 1, wherein the x-ray transmission window comprises a selected one of an aluminum thin film or an aluminum foil.

4. The x-ray tube of claim 1, wherein the target comprises a metal selected from a list of metals consisting of: gold, tungsten, copper, and combinations thereof.

5. The x-ray tube of claim 1, further comprising a tubular structure that supports the cube.

6. An x-ray tube, comprising:

(a) a support structure defining an opening therethrough;

(b) a concave x-ray transmission window sealed to the support structure and covering the opening, wherein the support structure and the x-ray transmission window define a void therein that contains at least a partial vacuum;

(c) a filament configured to emit electrons upon application of a sufficient potential difference between the filament and the x-ray transmission window; and (d) a target spaced away from the filament and disposed on an interior side of the x-ray transmission window, wherein the target generates x-rays as a result of being impacted by electrons from the filament and wherein at least a portion of the x-rays are transmitted through the x-ray transmission window, wherein the support structure comprises two spaced-apart discs and wherein the x-ray transmission window comprises a selected one of a metal thin film or a metal foil wrapped around and sealed to each of the two spaced-apart discs.

7. The x-ray tube of claim 6, wherein the support structure has a first thickness and wherein the x-ray transmission window has a second thickness that is thinner than the first thickness.

8. The x-ray tube of claim 6, wherein the x-ray transmission window comprises a selected one of an aluminum thin film or an aluminum foil.

9. The x-ray tube of claim 6, wherein the target comprises a metal selected from a list of metals consisting of: gold, tungsten, copper, and combinations thereof.

10. An x-ray tube, comprising:

(a) a support structure defining an opening therethrough;

(b) a concave x-ray transmission window sealed to the support structure and covering the opening, wherein the support structure and the x-ray transmission window define a void therein that contains at least a partial vacuum;

(c) a filament configured to emit electrons upon application of a sufficient potential difference between the filament and the x-ray transmission window; and (d) a target spaced away from the filament and disposed on an interior side of the x-ray transmission window, wherein the target generates x-rays as a result of being impacted by electrons from the filament and wherein at least a portion of the x-rays are transmitted through the x-ray transmission window, wherein the support structure comprises:

(i) a first plate having at least one first inwardly-curved edge; and (ii) a second plate, spaced apart from and parallel to the first plate, having at least one second inwardly-curved edge that is aligned with the least one first inwardly-curved edge, wherein a selected one of a metal thin film or a metal foil is wrapped around at least a portion of the first plate and the second plate to form the x-ray transmission window.

11. The x-ray tube of claim 10, wherein the support structure has a first thickness and wherein the x-ray transmission window has a second thickness that is thinner than the first thickness.

12. The x-ray tube of claim 10, wherein the x-ray transmission window comprises a selected one of an aluminum thin film or an aluminum foil.

13. The x-ray tube of claim 10, wherein the target comprises a metal selected from a list of metals consisting of: gold, tungsten, copper, and combinations thereof.

* * * * *